United States Patent
Mueckenheim et al.

(10) Patent No.: US 8,103,284 B2
(45) Date of Patent: Jan. 24, 2012

(54) METHOD FOR REPORTING UPLINK LOAD MEASUREMENTS

(75) Inventors: Jens Mueckenheim, Nuremberg (DE);
Dimitris Vasilaras, Swindon (GB);
George M. Warner, Chippenham (GB)

(73) Assignee: Alcatel Lucent, Paris (FR)

( * ) Notice: Subject to any disclaimer, the term of this patent is extended or adjusted under 35 U.S.C. 154(b) by 1201 days.

(21) Appl. No.: 11/388,374

(22) Filed: Mar. 24, 2006

(65) Prior Publication Data

US 2007/0225015 A1    Sep. 27, 2007

(51) Int. Cl.
*H04W 72/00* (2009.01)

(52) U.S. Cl. ........ 455/453; 455/423; 455/450; 455/522; 455/67.11; 370/235

(58) Field of Classification Search .................. 455/453, 455/423, 450, 522, 67.11; 370/235
See application file for complete search history.

(56) References Cited

U.S. PATENT DOCUMENTS

| | | | |
|---|---|---|---|
| 6,937,863 B1 * | 8/2005 | Gordon et al. | 455/446 |
| 7,447,514 B2 * | 11/2008 | Braun et al. | 455/522 |
| 2004/0157618 A1 * | 8/2004 | Brouwer | 455/453 |
| 2005/0176440 A1 * | 8/2005 | Sang et al. | 455/453 |
| 2005/0249148 A1 * | 11/2005 | Nakamata et al. | 370/328 |
| 2005/0251722 A1 * | 11/2005 | Terry et al. | 714/749 |
| 2006/0079267 A1 * | 4/2006 | Kim et al. | 455/522 |
| 2007/0281708 A1 * | 12/2007 | Bakhuizen et al. | 455/450 |

FOREIGN PATENT DOCUMENTS

WO    WO 2005/109686 A1 * 11/2005

OTHER PUBLICATIONS

3GPP TS 25.309 V6.6.0, Technical Specification Group Radio Access Network "FDD Enhanced Uplink Overall Description" Stage 2, pp. 1-34, Release 6, Mar. 2006.
3GPP TS 25.433 V6.10.0, Technical Specification Group Radio Access Network UTRAN Iub interface Node B Application Part (NBAP) Signaling, cover page and pp. 40-57 Release 6, Jun. 2006.
3GPP TSG-RAN WG 3 Meeting #49, R3-051210, "Non E-DCH Load Measurement" Seoul Korea, pp. 1-18, Nov 7-11, 2006.
3GPP TSG-RAN WG 1 Meeting #42, R1-050753, "HSUPA RRM Related Signalling" London, UK, 2 pgs, Aug. 29-Sep. 2, 2005.

* cited by examiner

*Primary Examiner* — Dwayne Bost
*Assistant Examiner* — Amancio Gonzalez
(74) *Attorney, Agent, or Firm* — Williams, Morgan & Amerson, PC (57) ABSTRACT

The present invention provides a method for reporting load measurements. The method may include providing information indicative of a first load associated with at least one first channel type to a first scheduling unit. The first load represents a difference between a second load associated with at least one second channel type and a third load.

19 Claims, 4 Drawing Sheets

METHOD FOR REPORTING UPLINK LOAD MEASUREMENTS

BACKGROUND OF THE INVENTION

1. Field of the Invention

This invention relates generally to communication systems, and, more particularly, to wireless communication systems.

2. Description of the Related Art

A conventional wireless communication system includes one or more base stations (or Node-Bs) that may provide wireless connectivity to one or more mobile units. The mobile units may include cellular telephones, personal data assistants, smart phones, text messaging devices, pagers, network interface cards, notebook computers, desktop computers, and the like. The mobile units and the base stations communicate by exchanging information over an air interface (or wireless communication link) that typically includes a number of channels, such as traffic channels, signaling channels, paging channels, and the like. However, the resources available to provide wireless connectivity are limited, which may limit the total load that may be supported by the base station and/or the wireless communication system.

Operation of the base stations may be coordinated by a controller such as a radio network controller (RNC), which is typically used in wireless communication systems that operate according to Universal Mobile Telecommunication System (UMTS) standards and/or protocols. One of the essential functions of the radio network controller is load control. The basic task of load control is to prevent overload by means of admission control and to overcome overload situations by means of congestion control. The main uplink resource to be managed by load control algorithms is uplink interference, which may be represented by measurements of a Received Total Wideband Power (RTWP), which is typically measured in dBm. For example, in a wireless communication system that operates according to the UMTS Third Generation Partnership Project (3GPP) standard, measurements of the RTWP are filtered and pre-processed in a receiving base station and then reported to the RNC via a Node-B Application Part (NBAP) Measurement Reporting message.

Figure 1:
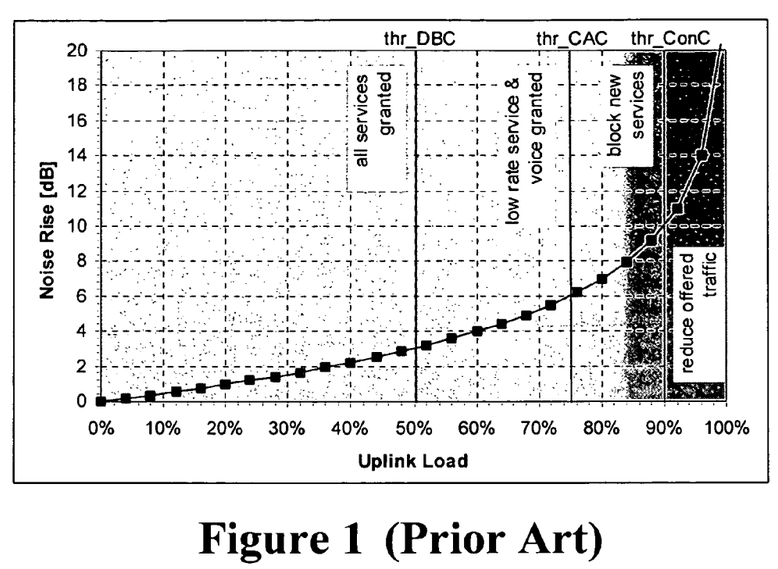
FIG. 1 shows an example of conventional uplink load control handling in a radio network controller.

FIG. 1 shows an example of conventional uplink load control handling in a radio network controller. First, the measurement is converted into a system load using the following relation:

$$\text{load} = 1 - \frac{1}{NR} = 1 - \frac{RTWP_0}{RTWP}. \quad (1)$$

In equation 1, the noise rise (NR) is computed using the difference between the measured RTWP and an estimated background noise $RTWP_0$ (also in dBm). Then, depending on the result, the load control algorithms may perform one or more actions. In the low load region, i.e. when load<thr_DBC, the admission control algorithm in the radio network controller may admit all new traffic requests. In the medium load region, i.e. when thr_DBC<=load<thr_CAC, the admission control algorithm may admit only traffic requests with lower resource consumption, e.g., traffic requests associated with transmissions that use a lower data rate. In the high load region, i.e. when thr_CAC<=load, the admission control algorithm in the radio network controller may block all incoming call requests. In the very high load region, i.e. when thr_ConC<=load, a congestion control algorithm in the radio network controller may reduce the load by reducing the data rate of one or several users. In the extreme case, connections of one or several users could be released by this procedure.

Figure 2:
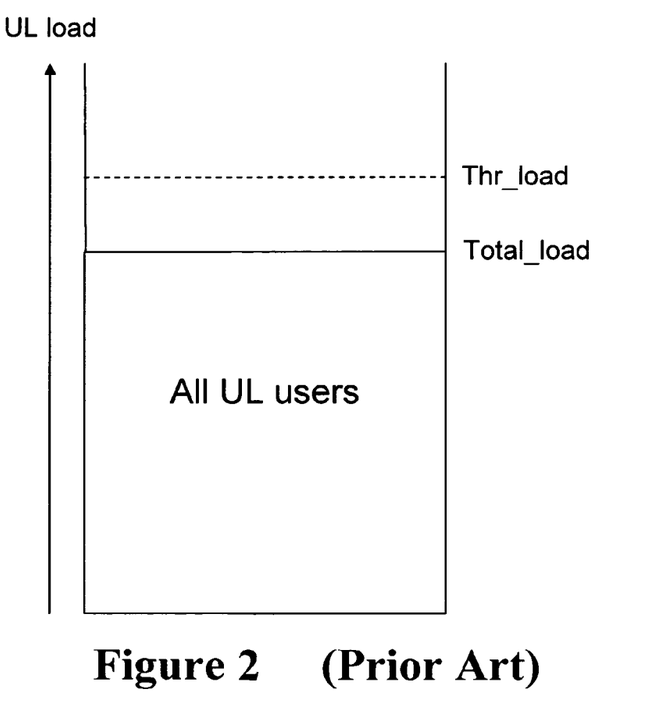
FIG. 2 shows a conventional uplink load that may be used for load control of legacy dedicated channel (DCH) users.

FIG. 2 shows a conventional uplink load that may be used for load control of legacy dedicated channel (DCH) users. The vertical axis indicates increasing uplink load, which may be obtained as indicated by equation 1. The value of the variable total_load indicates the contributions to the load from legacy DCH users plus some smaller portion from users on random access channels (RACH). Accordingly, the value of total_load will vary depending on the uplink loading of the system and hence provides a reasonable measure for performing the appropriate load control decisions. The radio network controller may therefore use the value of the variable total_load as input to the load control and/or congestion control algorithms, which may attempt to maintain the value of the variable total_load near a predetermined threshold load indicated by the value of the variable Thr_load.

In some wireless communication systems, additional channels may be used to support data transfer over the uplink. For example, the UMTS 3GPP standards define an enhanced dedicated channel (E-DCH), which is an enhancement of the uplink dedicated channel (DCH) with focus on more efficient support of packet switched (PS) data in the uplink. The E-DCH in the uplink corresponds to the high speed downlink shared channel (HS-DSCH) transport channel in the downlink, which also increases the efficiency of the PS data transmission as compared to the legacy dedicated channels. Transmissions over the enhanced dedicated channel are scheduled by an E-DCH scheduler that resides in each Node-B that supports the enhanced dedicated channel.

The E-DCH scheduler in each base station is responsible for controlling loads associated with E-DCH users in the serving cell and E-DCH users that are in nearby cells. For example, the E-DCH scheduler may attempt to keep the sum of all the loads (including the background noise) within a target value that is typically signaled from the RNC to the base station. The E-DCH scheduler may also attempt to keep the ratio of the load from E-DCH users of other cells and the total E-DCH load at a certain level, which is also signaled from RNC. The E-DCH scheduler may also apply the constraint that only resources that have been leftover from the other users can be taken for scheduled E-DCH users.

However, some portions of the load (such as portions of the load associated with legacy dedicated channels) are not under the control of the E-DCH scheduler. The 3GPP UMTS standards have not specified new measurements that may be used by the radio network controller to determine, and thereby control, the portions of the load that are not under the control of the E-DCH scheduler but are controlled by RNC. In particular, conventional radio network controllers are unable to determine the portion of the load that should be under control of the radio network controller. Consequently, load control in conventional radio network controllers uses RTWP measurements to determine the UL load.

Performing uplink load control at the radio network controller using RTWP measurements has a number of drawbacks. Given a sufficient traffic volume on the E-DCH, the E-DCH scheduler will try to allocate all remaining resources that have been left over from the uplink users not under its control. Consequently, the value of the total load determined using the RTWP measurements would remain near the target value of the load and the radio network controller would always determine that the resources are properly allocated, regardless of the relative values of the loads associated with E-CH users and other users.

One potential solution to this problem is to set the threshold value thr_CAC for load control to a value that is approximately equal to the target load value. However, when the nc_load from the UL users that are not controlled by the E-DCH scheduler increases, the load control will not perform any action before nc_load reaches the target load and hence the difference between the target load and nc_load becomes smaller. Because the E-DCH scheduler can only control this difference between the target load and nc_load, which has been leftover from the other users, the available resources, which can be used by E-DCH, may decrease down to zero. Consequently, in that case the E-DCH scheduler may reduce the resources allocated to all users down to zero before any load control action is taken. Furthermore, due to the reporting of nearly constant RTWP (and therefore a nearly constant UL load), the radio network controller may be unable to perform data rate specific load control actions that were used in legacy DCH load control. In consequence, it is believed that high data rates on DCH, e.g. data rates of about 384 k or larger, cannot be supported with the current E-DCH load control when E-DCH is used in the same cell.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for reporting load measurements. The method may include providing information indicative of a first load associated with at least one first channel type to a first scheduling unit. The first load represents a difference between a second load associated with at least one second channel type and a third load.

In another embodiment of the present invention, a method is provided for receiving reported load measurements. The method may include receiving information indicative of a first load associated with at least one first channel type. The first load represents a difference between a second load that is used that is used by a load control unit to control loads associated with at least one second channel type and a third load.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 3:
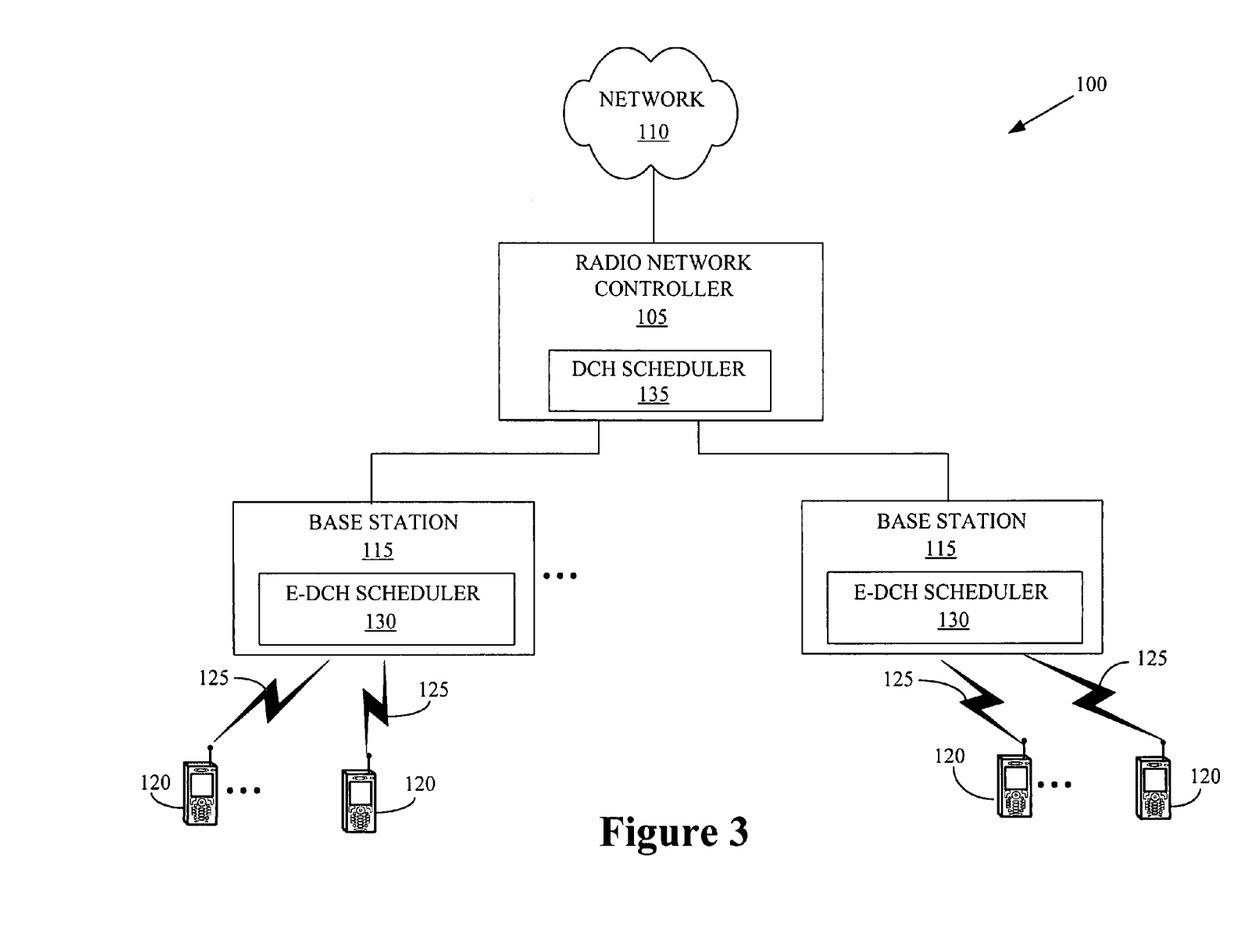
FIG. 3 conceptually illustrates one exemplary embodiment of a wireless communication system, in accordance with the present invention.

FIG. 3 conceptually illustrates one exemplary embodiment of a wireless communication system 100. In the illustrated embodiment, the wireless communication system 100 operates according to standards and/or protocols defined by the Third Generation Partnership Project (3GPP) for the Universal Mobile Telecommunication System (UMTS). However, persons of ordinary skill having benefit of the present disclosure should appreciate that the standards and/or protocols used to implement the wireless communication system 100 are matters of design choice and not material to the present invention. Accordingly, in alternative embodiments, other wired and/or wireless standards and/or protocols may be implemented in the wireless communication system 100.

The wireless communication system 100 includes a radio network controller 105 that is communicatively coupled to a network 110, such as a mobile operators core network, which itself maybe connected to another network, such as an Internet. The radio network controller 105 coordinates operation of one or more base stations 115 and provides access to the network 110. The base stations 115 may provide wireless connectivity to one or more mobile units 120 over air interfaces 125 according to one or more wireless communication standards and/or protocols, such as discussed above. Techniques for implementing, configuring, operating, and/or maintaining the radio network controller 105, the base stations 115, the mobile units 120, the air interfaces 125, and any other interfaces between portions of the wireless communication system 100 are known to persons of ordinary skill in the art and, in the interest of clarity, only those aspects of implementing, configuring, operating, and/or maintaining these devices and/or interfaces that are relevant to the present invention will be discussed further herein.

The base stations 115 and the mobile units 120 may exchange information over the air interfaces 125 using channels of various types, such as dedicated channels, random access channels, control channels, and the like. For example, one or more of the air interfaces 125 may support one or more uplink dedicated channels (DCH), one or more random access channels (RACH), one or more uplink control channels, and the like. For another example, one or more of the air interfaces 125 may support an enhanced dedicated channel (E-DCH) that provides efficient support of packet-switched data on the uplink. The DCH is the basic UL transport channel, which caries circuit switched traffic such as voice or packet switched services. The DCH resources, which are mainly frequency, CDMA code and UL transmit power, may be allocated and controlled by the radio network controller 105. The E-DCH is an advanced UL transport channel that is used to carry packet switched data. While frequencies and/or and CDMA codes are still allocated by the radio network controller 105, the UL transmit power is controlled by the E-DCH scheduler 130 in the base station 115.

Each of the mobile units 120 places a load upon the wireless communication system 100. As used herein, the term "load" will be understood to refer to the resources that are allocated to and/or consumed by each of the mobile units 120 deployed within the wireless communication system 100. For example, the load associated with an active mobile unit 120 may include a portion of the received total wideband power and a radiofrequency bandwidth required to support data transmission over the air interface 125 and the associated signaling overhead, as well as the resources expended or allocated by the radio network controller 105 and/or the base station 115 to establish, operate, maintain, and/or tear down the wireless communication link to the mobile unit 120. Portions of the load on a base station 115 may be associated with transmission over different types of channels in the air interface 125. For example, a first portion of the load on the base station 115 may be produced by transmissions over an uplink enhanced dedicated channel and a second portion of the load may be produced by transmissions over a legacy dedicated channel.

Each of the base stations 115 includes a scheduler 130 that may implement one or more load control operations, such as admission control and/or congestion control. In the illustrated embodiment, the scheduler 130 is an enhanced dedicated channel (E-DCH) scheduler 130 that is configured to control loads associated with enhanced dedicated channels. As will be discussed in detail below, the scheduler 130 is configured to use an estimate of the loads associated with the enhanced dedicated channel type to perform the appropriate load control operations. Since the total load associated with each of the base stations 115 may also include a portion associated with other channel types, the base stations 115 may also be configured to provide information indicative of the load associated with these other channel types to the radio network controller 105. For example, the base stations 115 may be configured to provide information indicative of a load associated with legacy dedicated channels to the radio network controller 105.

The radio network controller 105 includes a scheduler 135 that may implement one or more load control operations, such as admission control and/or congestion control. In the illustrated embodiment, the scheduler 135 is a dedicated channel (DCH) scheduler 135 that is configured to control loads associated with legacy dedicated channels and other loads that are not controlled by the scheduler 130. As will be discussed in detail below, the scheduler 135 is configured to use the load information provided by the base station 115 to perform the appropriate load control operations. In one embodiment, the radio network controller 105 may generate load control parameters by performing the load control operations and may provide information indicative of the load control parameters to one or more of the base stations 115. Examples of the load control parameters may include data rates associated with one or more users, indications that one or more users should be dropped for congestion control, and the like.

Figure 4:
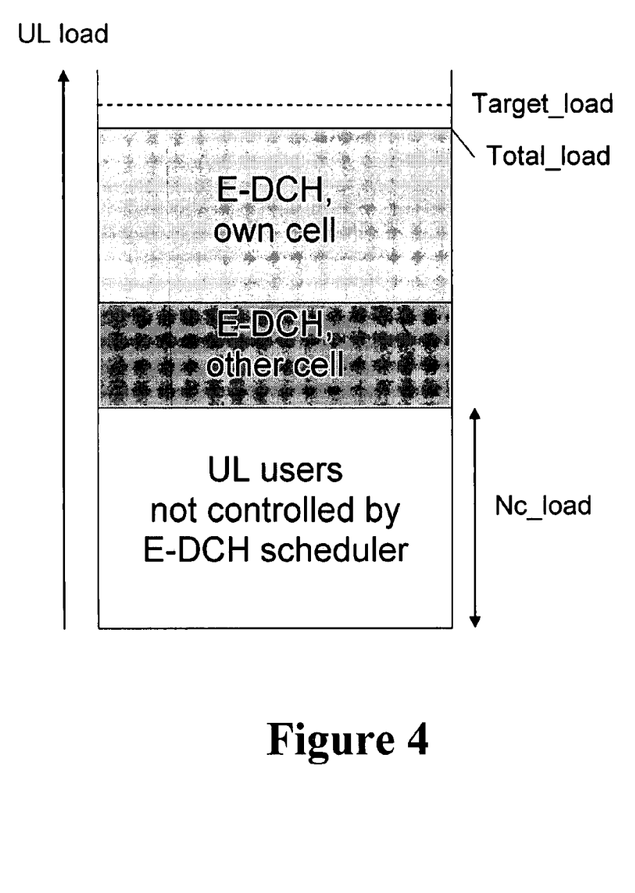
FIG. 4 shows one exemplary embodiment of a distribution of loads in a system that implements enhanced dedicated channels, in accordance with the present invention.

FIG. 4 shows one exemplary embodiment of a distribution of loads in a system that implements enhanced dedicated channels. In the illustrated embodiment, the total load includes the load caused by users that are controlled by the E-DCH scheduler, which are part of the serving cell associated with the base station that hosts the E-DCH scheduler. This portion is controlled by sending dedicated relative scheduling grants or absolute scheduling grants to each affected user, individually. Scheduled E-DCH transmission is used for PS traffic, which at a certain degree can tolerate some transmission delay e.g. best effort traffic such as interactive/background service or guaranteed bitrate traffic such as streaming service. The total load may include load caused by the users that are controlled by the E-DCH scheduler, but which are not part of the serving cell. This portion may be controlled by sending common relative scheduling grants to all or a group of affected users.

The total load may also include loads that may not be controlled by the E-DCH scheduler. The major sources of this load are legacy DCH users, such as users that use circuit-switched (CS) voice service or use mobile units that do not support E-DCH. Additional sources of loads that are not controlled by the E-DCH scheduler are common channels such as RACH, non scheduled E-DCH transmission, which is used for delay sensitive PS traffic such as conversational (e.g., VoIP) or signaling traffic, and uplink control channels such as HS-DPCCH and E-DPCCH. However, persons of ordinary skill in the art having benefit of the present disclosure should appreciate that these examples of loads that are not controlled by the E-DCH scheduler are intended to be illustrative and not to limit the present invention.

Figure 5:
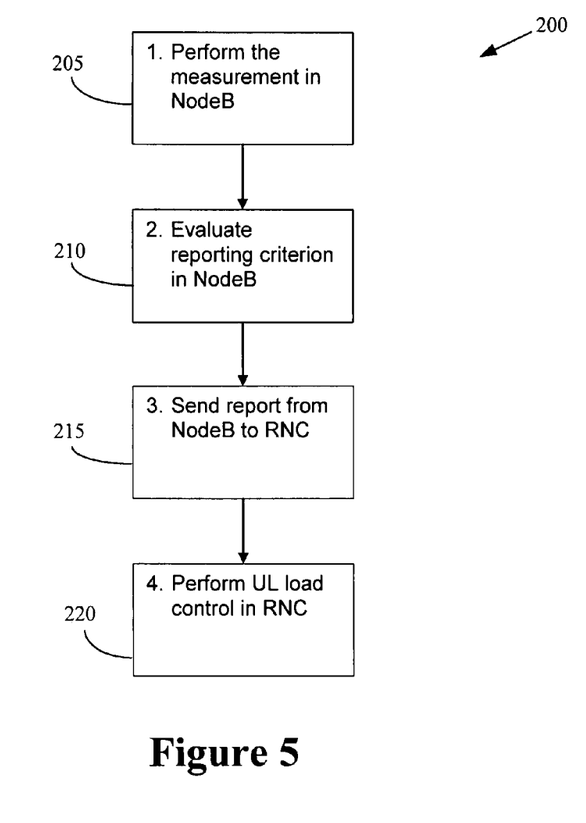
FIG. 5 conceptually illustrates one exemplary embodiment of a method of load control for different types of channels, in accordance with present invention.

FIG. 5 conceptually illustrates one exemplary embodiment of a method 200 of load control for different types of channels. In the illustrated embodiment, the different types of channels include channels that are associated with loads that can be controlled by an enhanced dedicated channel scheduler and loads that cannot be controlled by an enhanced dedicated channel scheduler. However, persons of ordinary skill in the art having benefit of the present disclosure should appreciate that the present invention is not limited to these types of channels. In alternative embodiments, loads associated with other types of channels may also be controlled.

In the illustrated embodiment, a base station or Node-B determines (at 205) a load (referred to hereinafter as nc_load) associated with one or more types of channels that are not controlled by the scheduler resident on the Node-B. For example, the Node-B may perform (at 205) one or more measurements that may be used by the E-DCH scheduler to determine nc_load using the following relation:

$$nc\_load = total\_load - scheduled\_load \quad (2)$$

$$= 1 - \frac{RTWP_0}{RTWP} - \sum_{\substack{scheduled \\ users\ i}} \left(\frac{E_c}{I_0}\right)_i \cdot TPR_i.$$

The first part (nc_load) in equation (2) is the total load as discussed above, $(E_c/I_0)_i$ is the energy per chip to interference power ratio that is measured on the associated UL DPCCH, and $TPR_i$ is the power ratio between E-DPDCH and UL DPCCH for the scheduled user #i. For another example, the load nc_load can be obtained directly from physical layer (PHY) measurements performed at the Node-B as follows:

$$nc\_load = \frac{\sum_{\substack{non-scheduled \\ user\ j}} RSCP_j}{RTWP}. \quad (3)$$

In equation (3), the values of $RSCP_j$ are the received signal code powers as measured on the physical channels for the non-scheduled user #j and RTWP is the total received wideband power. In one embodiment, the above measurements may be filtered, e.g. by a filter period of 100 msec, in order to reduce fluctuations of the estimate of nc_load. The measurement samples may then be generated for delivery.

The Node-B may then determine (at 210) when information indicative of the load estimate should be delivered to the radio network controller, e.g. by evaluating one or more reporting criteria. Exemplary reporting criteria may include, but are not limited to, reporting based upon a predetermined schedule or periodicity, reporting according to thresholds, and/or sending a report in response to a request (e.g., a measurement control message) for the load estimate from the radio network controller. For example, information indicative of the load estimate may be delivered according to a schedule that indicates that the sample should be transmitted to a radio network controller every 100 msec. In one embodiment, the reporting criteria may be implemented to reduce the amount of signaling that may be required. The reporting criterion can be adjusted by the radio network controller, which allows full flexibility in controlling the measurement reporting.

The Node-B may also filter (at 210) portions of the information indicative of the load estimate before delivery. For example, the information indicative of the load estimate may be filtered (at 210) using Layer 3 filtering of the raw samples, which may use a simple forgetting factor filter. However, persons of ordinary skill in the art having benefit of the present disclosure should appreciate that filtering is optional and, when filtering is implemented, any type filter may be used. In one embodiment, the filtering may be implemented to reduce the amount of signaling that may be required. The filtering parameters can be adjusted by the radio network controller, which allows full flexibility in controlling the measurement reporting.

The information indicative of the load estimate may then be transmitted (at 215) to the radio network controller. In one embodiment, a measurement report is sent from the Node-B to the radio network controller over an Iub interface, which is a well-known interface defined by the 3GPP standards. For example, a measurement report message may be sent to the radio network -controller via Node-B Application Part (NBAP). The measurement report message may be any message that includes the information indicative of the load estimate. For example, a measurement report message may be a standardized extension of the existing NBAP Common Measurement message, in which case a new measurement type may be added to the already existing common measurements. For another example, proprietary messages for measurement reporting and adjusting the measurement parameters may be used to implement the measurement report message. For yet another example, one or more existing measurement types, which became obsolete during previous standardization processes, may be used to implement the measurement report message. Examples of obsolete measurement types are the measurements related to the Common Packet Channel (CPCH), which have been removed from the 3GPP standards.

The radio network controller may then perform (at 220) one or more load control operations, such as admission control and/or congestion control, based on the load control information provided by the Node-B. For example, when the radio network controller receives a measurement report from the Node-B, the radio network controller may perform (at 220) the appropriate load control operations for the users not controlled by the E-DCH scheduler. In one embodiment, the radio network controller may store the reported values of the load estimates for future usage, e.g. by admission control algorithms and/or congestion control algorithms. The radio network controller may also react substantially immediately with congestion control to reduce some existing users if the reported value is above a specific threshold, such as nc_load>thr_ConC. The affected users are mainly the ones sending on DCH or with non-scheduled traffic on E-DCH. In one embodiment, the radio network controller may provide one or more load control parameters to the Node-B, which may use these parameters when performing load control operations.

The proposed method has a number of advantages over conventional load control techniques. For example, providing information indicative of the portion of the UL load that is not controlled by the schedulers in the base stations (or Node-Bs) may allow the radio network controller to control this portion of the UL load by applying load control algorithms such as admission control and congestion control. Furthermore, by expressing this UL load as power ratio instead of absolute measurement, the accuracy of the expressions for the uplink load can be improved to be suitable for load control. Because this portion of the load may vary with the UL traffic caused by the channel types that are not controlled by the scheduler in the Node-B, the RNC can apply conventional principles of load control to these channels, such as the legacy DCH. In particular, it is now possible to perform rate specific load control actions and hence the system can now support E-DCH together with relatively high data rates, e.g. 384 k, on DCH in the same cell.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   determining, at a base station, a first load on at least one first uplink channel type based on a ratio of a measured received total wideband power and an estimated background noise received total wideband power and based on a sum of a product of an energy per chip to interference power ratio and a power ratio of uplink and downlink channels, the sum being taken over users that are scheduled by the base station, wherein load control for said at least one first uplink channel type is performed in a radio network controller, the first load representing a difference between a second load on at least one second uplink channel type and a total uplink load;
   providing, from the base station to the radio network controller, information indicative of the first load so that the radio network controller can perform at least one of admission control or congestion control for said at least one first uplink channel type based on the first load; and
   performing, at the base station, at least one of admission control or congestion control for said at least one second uplink channel type based on the second load.

2. A method, comprising:
   determining, at a base station, a first load on at least one first uplink channel type based on a ratio of a sum of a physical channel measurement of a received signal code power for a user to a received total wideband power, the sum being taken over users that are scheduled by the radio network controller, wherein load control for said at least one first uplink channel type is performed in a radio network controller, the first load representing a difference between a second load on at least one second uplink channel type and a total uplink load;
   providing, from the base station to the radio network controller, information indicative of the first load so that the radio network controller can perform at least one of admission control or congestion control for said at least one first uplink channel type based on the first load; and
   performing, at the base station, at least one of admission control or congestion control for said at least one second uplink channel type based on the second load.

3. The method of claim 1, comprising determining the information indicative of the first load by applying at least one filter to the determined first load.

4. The method of claims 1 or 2, wherein providing the information indicative of the first load comprises providing the information indicative of the first load based on at least one of a reporting schedule, a threshold, and a request for the information indicative of the first load.

5. The method of claims 1 or 2, wherein providing the information indicative of the first load comprises providing the information indicative of the first load in a measurement report message that is transmitted from the base station to the radio network controller.

6. The method of claims 1 or 2, comprising receiving, at the base station and from the radio network controller, at least one load control parameter determined by the load control unit in the radio network controller in response to providing the information indicative of the first load.

7. The method of claims 1 or 2, wherein providing said information indicative of the first load associated with said at least one first uplink channel type to the load control unit comprises providing information indicative of a first load associated with a legacy dedicated channel to the load control unit in the radio network controller.

8. The method of claims 1 or 2, wherein providing information indicative of the first load comprises providing information indicative of a difference between a second load associated with at least one enhanced dedicated channel and the total uplink load.

9. The method of claims 1 or 2, comprising scheduling, at the base station, users for said at least one second uplink channel type based upon the second load.

10. The method of claims 1 or 2, wherein said at least one first uplink channel type comprises at least one unscheduled legacy uplink channel type, and wherein said at least one second uplink channel type comprises at least one scheduled uplink channel type.

11. A method, comprising:
    receiving, at a radio network controller and from at least one base station, information indicative of a first load associated with at least one first uplink channel type, wherein said information indicating the first load is determined based on a ratio of a measured received total wideband power and an estimated background noise received total wideband power and based on a sum of a product of an energy per chip to interference power ratio and a power ratio of uplink and downlink channels, the sum being taken over users that are scheduled by the base station, the first load being determined by said at least one base station, and the first load representing a difference between a second load associated with at least one second uplink channel type and a total uplink load; and performing, at the radio network controller, at least one of admission control or congestion control for said at least one first uplink channel type based on the first load, and wherein the base station performs at least one of admission control or congestion control for said at least one second uplink channel type based on the second load.

12. A method, comprising:

receiving, at a radio network controller and from at least one base station, information indicative of a first load associated with at least one first uplink channel type, wherein said information indicating the first load is determined based on a ratio of a sum of a physical channel measurement of a received signal code power for a user to a received total wideband power, the sum being taken over users that are scheduled by the radio network controller, the first load being determined by said at least one base station, and the first load representing a difference between a second load associated with at least one second uplink channel type and a total uplink load; and performing, at the radio network controller, at least one of admission control or congestion control for said at least one first uplink channel type based on the first load, and wherein the base station performs at least one of admission control or congestion control for said at least one second uplink channel type based on the second load.

13. The method of claims 11 or 12, wherein receiving the information indicative of the first load comprises receiving the information indicative of the first load based on at least one of a reporting schedule, a threshold, and the request for the information indicative of the first load.

14. The method of claims 11 or 12, wherein receiving the information indicative of the first load comprises receiving the information indicative of the first load in a measurement report message transmitted from said at least one base station to the radio network controller.

15. The method of claims 11 or 12, comprising performing, at the load control unit in the radio network controller, admission control or congestion control based on the information indicative of the first load.

16. The method of claim 15, comprising providing, from the radio network controller to said at least one base station, at least one load control parameter in response to performing admission control or congestion control based on the information indicative of the first load.

17. The method of claims 11 or 12, wherein receiving said information indicative of the first load associated with said at least one first uplink channel type comprises receiving, from said at least one base station, information indicative of a first load associated with a legacy dedicated channel.

18. The method of claims 11 or 12, wherein receiving information indicative of the first load comprises receiving information indicative of a difference between a second load associated with at least one enhanced dedicated channel and the total uplink load.

19. The method of claims 11 or 12, wherein said at least one first uplink channel type comprises at least one unscheduled legacy uplink channel type, and wherein said at least one second channel type comprises at least one scheduled uplink channel type.

* * * * *